W. YOUNGBLOOD.
WAGON STEP.
No. 68,930. Patented Sept. 17, 1867.
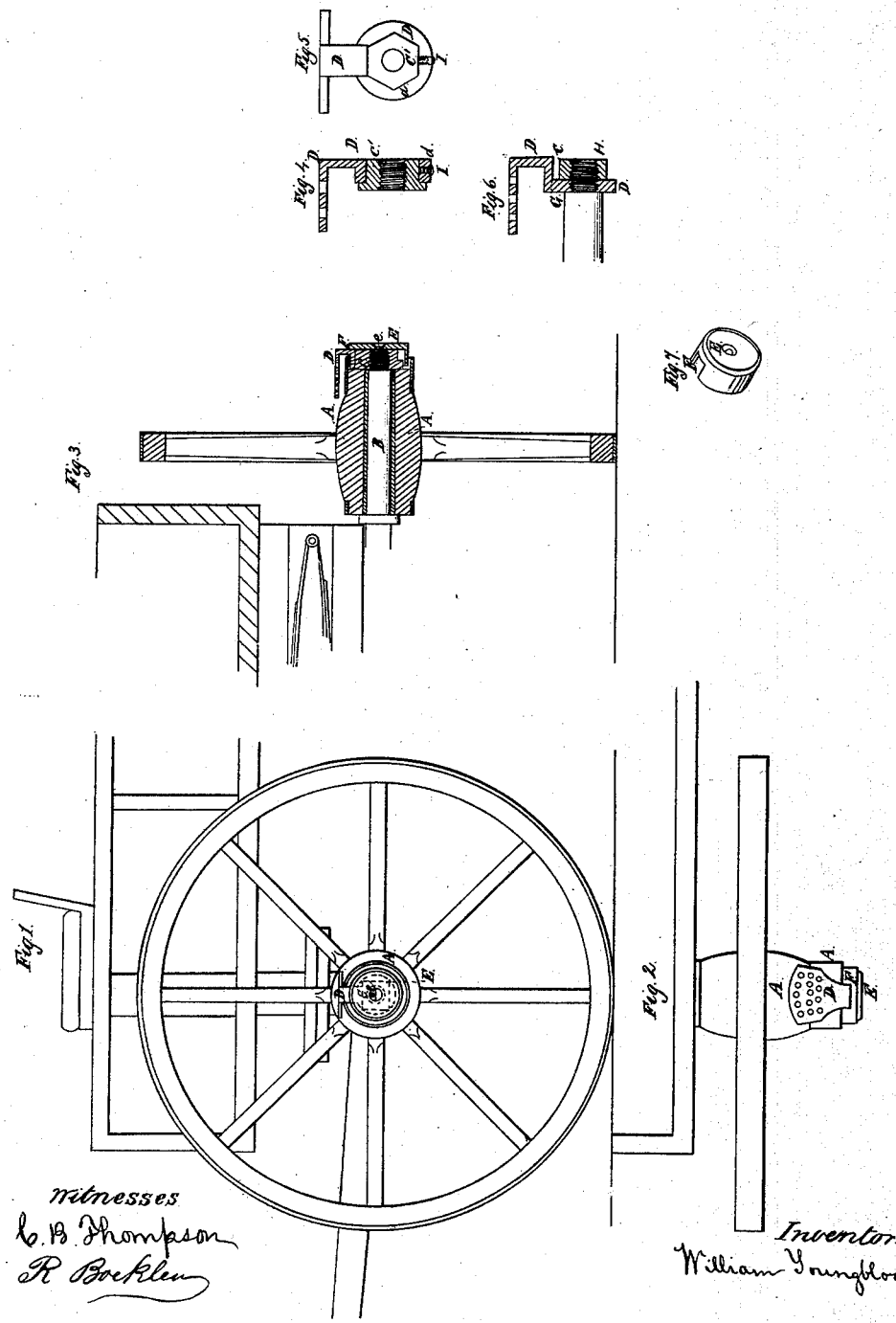

United States Patent Office.

WILLIAM YOUNGBLOOD, OF NEW YORK, N. Y.

Letters Patent No. 68,930, dated September 17, 1867.

---

IMPROVED WAGON-STEP.

---

The Schedule referred to in these Letters Patent and making part of the same.

---

TO ALL WHOM IT MAY CONCERN:

Be it known that I, WILLIAM YOUNGBLOOD, of the city, county, and State of New York, have made a certain new and improved Step for Wagons; and I do hereby declare that the following is a full, clear, and exact description of the construction and operation of the same, reference being had to the accompanying drawings, making a part of this specification, in which—

Figure 1 represents a front view of my improved step for wagons.

Figure 2 represents a top view of the same.

Figure 3 represents a central vertical section of the wheel and step.

Figure 4 represents a detached vertical section of my step, the same being shown made detachable from the screw-nut of the axle.

Figure 5 represents an end view of the same.

Figure 6 represents a modification of the step shown in fig. 2, the step being secured and forming a part of the screw-nut of the axle, with an additional nut, for greater security.

Figure 7 represents a perspective view of the front guard or cap of the axle of the same.

Similar letters of reference indicate corresponding parts in the several figures.

The nature of my invention consists in the employment of a step or steps, secured upon the axle outside of the wheel or wheels of a wagon, and located immediately over the hub or hubs of said wheels, whereby a person mounting or stepping in or out of the wagon can do so with more facility, when the wagon is at rest or in motion, than with the ordinary step.

To enable others skilled in the art to make and use my invention, I will proceed to describe its construction and operation.

A, in figs. 1, 2, and 3, represents the nub of a wagon-wheel; B is the axle of the same, both made in the ordinary manner. C is the screw-nut on the end of the axle, which is used to keep the wheel on. D is a piece of metal, formed into a step, and secured to the upper side of the nut, and thereby forming a part of the same. The said step is bent over the hub A at its outer part, but not in contact with the hub. The nut, with step attached, is screwed firmly upon the axle; but to prevent the step from turning, and to guard it from collisions, I employ a guard-washer or cap, E, rigidly attached to the extremity of the axle by a screw, e, and made with a slot, F, fitting the neck or shank of the step D, thereby preventing its turning. Instead of attaching the step to the ordinary single nut, the step can be attached to an annular nut, G, which has an additional nut, H, to set it up more securely, as shown in fig. 6. Or, instead of permanently attaching the step to the nut C, as in the foregoing, the step may be made with a socket, d, to fit upon the ordinary nut C', used to keep on the wheel, the said socket being provided with a set-screw, I, to secure it in its place, as shown in figs. 4 and 5.

From the foregoing it will be evident that a step so constructed and located, as above shown, greatly facilitates the act of getting on or off the wagon, particularly when the wagon is in motion; and, in case of accident, its value in affording an easy and safe means of egress from the wagon is evident. It is also evident that a step, as above described, is of easy and general application, and inexpensive; and it will be plain to perceive that by having the step located on the outside of the hub of the wheel, as above described, the usual necessity of cramping the vehicle, to facilitate egress or ingress, is avoided, which is often difficult with restless horses. Finally, it is obvious that the step, with the cap E enclosing it, is protected from injury by collisions with other objects.

What I claim as my invention, and desire to secure by Letters Patent, is—

1. The employment of a step or steps, secured upon the axle outside of the wheel or wheels of a wagon, and located immediately over the hub or hubs of said wheels, substantially as and for the purpose herein described.

2. The construction and arrangement of the step D with the nut C and guard E, substantially as and for the purpose set forth.

WILLIAM YOUNGBLOOD.

Witnesses:
C. B. THOMPSON,
R. BOEKLEN.